United States Patent [19]

Öszüt

[11] Patent Number: 4,593,579

[45] Date of Patent: Jun. 10, 1986

[54] PROCESSING MACHINE FOR SURFACE TREATMENT

[76] Inventor: Mümin Öszüt, Morikestrasse 28, 7128 Lauffen, Fed. Rep. of Germany

[21] Appl. No.: 657,088

[22] Filed: Oct. 3, 1984

[30] Foreign Application Priority Data

Oct. 6, 1983 [DE] Fed. Rep. of Germany ....... 3336381

[51] Int. Cl.⁴ .......................... G05G 1/00; F16H 21/20
[52] U.S. Cl. ...................................... 74/571 R; 74/44
[58] Field of Search ................... 74/44, 571 R, 571 L, 74/571 M, 836

[56] References Cited

U.S. PATENT DOCUMENTS

| | | |
|---|---|---|
| 1,648,008 | 11/1927 | Selby et al. |
| 2,067,399 | 1/1937 | Hughes ............... 74/571 R |
| 2,541,573 | 2/1951 | Conner ............... 74/571 R |
| 2,690,081 | 9/1954 | Bjorklund et al. ........ 74/44 |
| 4,031,778 | 6/1977 | Fazekas ............... 74/571 C |
| 4,233,850 | 11/1980 | Edwardson ............... 74/44 |

FOREIGN PATENT DOCUMENTS 1502979 12/1971 Fed. Rep. of Germany .
2534626 7/1982 Fed. Rep. of Germany .
285217 12/1952 Switzerland .

Primary Examiner—Lawrence J. Staab
Attorney, Agent, or Firm—Thomas W. Speckman

[57] ABSTRACT

Processing machine for the surface treatment of workpieces having a push rod which can be reciprocated connected with a processing tool and put in motion by a driven eccentric drive assembly, the throw of the eccentric being adjustable by rotation of an eccentric casing. The processing result is improved by an oppositely acting eccentric mass balance assembly attached to the eccentric drive assembly which eliminates the undesired effect of the unbalanced forces, thereby providing quiet operation of the processing machine.

14 Claims, 4 Drawing Figures

PROCESSING MACHINE FOR SURFACE TREATMENT

BACKGROUND OF THE INVENTION

1. Field of the Invention

This invention relates to a processing machine for the surface treatment of workpieces in which a push rod which can be reciprocated is connected to a processing tool, and is put in motion by a driven eccentric drive assembly; the imbalance of the eccentric drive is balanced by means of an eccentric mass balance assembly with the eccentric of the eccentric drive assembly and the countereccentric of the eccentric mass balance assembly being of equal size and being arranged in a torsion-resistant fashion and opposed by 180° on a drive shaft.

2. Description of the Prior Art

A processing machine of this general type, designed as a saw, has been described in U.S. Pat. No. 1,648,008. The two eccentrics and their eccentric casings are coupled, on the one hand, directly with the saw blade and on the other hand, with the balancing element. Furthermore, the working range of the eccentric mass balance with reference to the drive shaft is in a direction other than that of the processing tool, so that this type of drive is not suited for manual devices for surface treatment.

A device for the mass balance of machines driven by a crank drive is described in German Patent DE-PS No. 25 34 626. This well known device provides two eccentrics mounted on bearings and placed into each other which control a complicated and expensive lever bar with a counterbalance weight that is not suitable for a device for surface treatment.

SUMMARY OF THE INVENTION

It is the objective of this invention to provide a processing machine for surface treatment of the type mentioned above where the eccentric drive assembly and the eccentric mass balance assembly can be placed in a small, compact housing and nevertheless the throw of the eccentric controlling the push rod can be changed easily, with the eccentric mass balance automatically being adjusted to the changed throw of the eccentric.

This objective is attained in this invention by the eccentric of the eccentric drive assembly being connected with an eccentric casing and the countereccentric of the eccentric mass balance assembly being provided with a countereccentric casing, the eccentric casing and the countereccentric casing are connected to each other in a torsion-resistant fashion, and together are adjustable relative to their eccentrics; on the countereccentric casing there is a counterbalance weight which is guided in a longitudinal guide and adjustable relative to the push rod, and an adjusting device to change the throw of the eccentric comprising a handle connected in a torsion-resistant fashion to the drive shaft and a bearing piece connected in a torsion-resistant fashion with the eccentric casing, with the handle and the bearing piece being connected to each other in a torsion-resistant fashion by means of a setscrew.

All components of the eccentric drive assembly and of the eccentric mass balance assembly are located around a drive shaft so that a small and compact housing can be used. The manual processing machine made in this manner can be gripped easily and held for a long time without tiring. Adjustment of the handle changes correspondingly and simultaneously the throw of the eccentric and the eccentric mass balance, so that independent of the adjusted throw of the eccentric and the stroke of the push rod, the imbalance is always balanced automatically.

Further characteristics of the invention are described below.

BRIEF DESCRIPTION OF THE DRAWINGS

One embodiment of the invention is described in detail below and is illustrated in the drawings in which.

DESCRIPTION OF PREFERRED EMBODIMENTS

Figure 1:
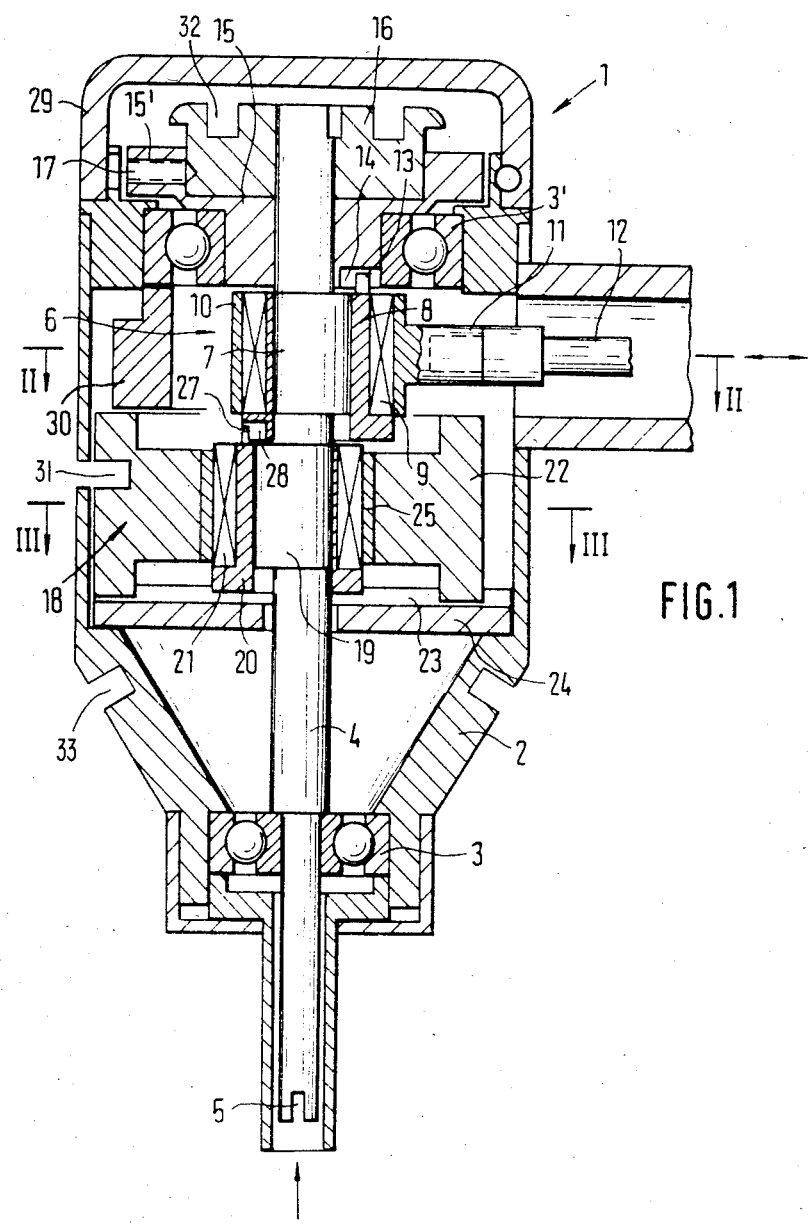
FIG. 1 shows a sectional view through the drive head of a processing machine.
Figure 2:
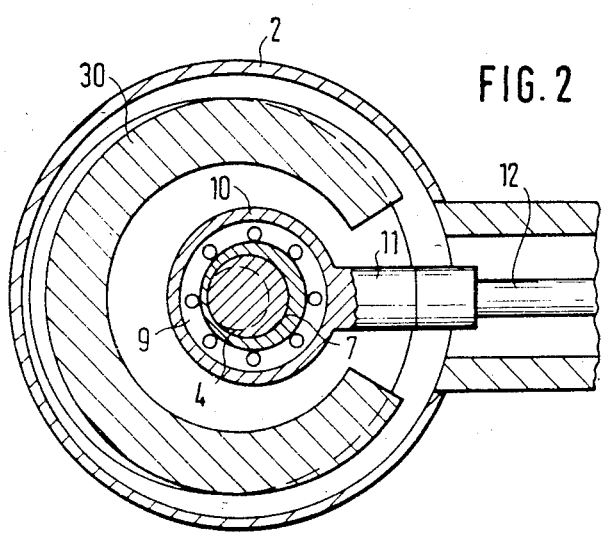
FIG. 2 shows a sectional view through line II—II of FIG. 1.
Figure 3:
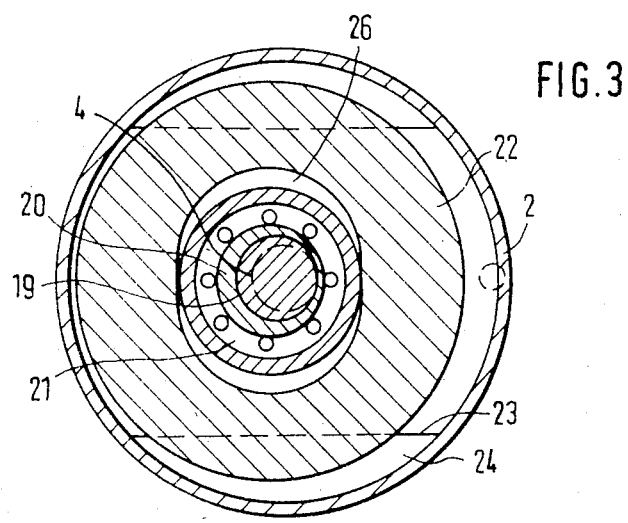
FIG. 3 shows a sectional view through line III—III of FIG. 1.

A processing machine for the surface processing of workpieces comprises drive head 1 which simultaneously serves also as a handle. Drive head 1 has an approximately cylindrical housing 2 in which drive shaft 4 is positioned coaxially and held rotatably in two end zones in bearings 3, 3'. On the lower end and accessible from the outside a connecting part 5 is provided on drive shaft 4 for the connection of a motor or for a flexible shaft driven by a motor. Between the two bearings 3, 3', closer to bearing 3' and at the opposite end to connecting part 5, an eccentric drive assembly 6 is arranged on drive shaft 4 on which eccentric casing 8 is rotatable. Needle bearing 9, or the like, fits around eccentric casing 8 and is surrounded by bearing ring 10. To the latter, connecting cylinder 11 is attached which protrudes perpendicular to drive shaft 4 and into which push rod 12 is screwed. Connecting rod 12 is attached to a surface processing tool which carries out a reciprocal motion in a manner which is not shown.

Extension 13 of eccentric casing 8 pointing upward protrudes into oblong hole 14 of bearing piece 15 in which the drive shaft 4 is placed and which itself is located in bearing 3'. The bearing piece 15 is hollow and ring-like on the end which points outward. In this hollow, disk-shaped handle 16 is inserted rotatably and connected in a torsion-resistant fashion with drive shaft 4. In protruding ring 15' of bearing piece 15, setscrew 17 is inserted which can be screwed against handle 16 to connect the handle in a torsion-resistant fashion with bearing piece 15. Recesses for the positive locking of the screw tip may be expediently provided on the periphery of handle 16. Furthermore, a scale may be attached to read or to set repeatedly a particular setting. By turning handle 16 relative to bearing piece 15, eccentric casing 8 on eccentric 7 is rotated so that the throw of the eccentric is changed. The setting with the largest throw of the eccentric is illustrated in the figures. When rotated by 180°, the smallest throw of the eccentric is set. With the eccentricity of eccentric 7 and of eccentric casing 8 being the same, the two eccentricities balance each other in the minimal setting so that push rod 12 is still. The handle 16 may be covered by removable hood 29.

Below eccentric drive assembly 6, an eccentric mass balance assembly 18 is provided which counteracts the imbalance of eccentric drive assembly 6. For this purpose countereccentric 19 corresponding to eccentric 7 is provided which has been shifted by 180° on drive shaft 4. Countereccentric casing 20 corresponding to eccentric casing 8 is located on countereccentric 19. The setting with the greatest throw of the countereccentric is likewise illustrated. On countereccentric casing 20 there is provided bearing 21, preferably a needle bearing, on which counterbalance weight 22 is placed. By means of a recess, it is placed in longitudinal guide 23 of bearing plate 24 resting in housing 2. Longitudinal guide 23 is aligned parallel to push rod 12. For the transmission of force, bearing 21 is surrounded by bushing 25 which is arranged in slot guide 26 of balance weight 22. The long axis of slot guide 26 is directed perpendicular to longitudinal guide 23 so that balance weight 22 accomplishes a longitudinal motion in longitudinal guide 23 opposite to the eccentric motion of eccentric 7 or push rod 12 during the rotation of countereccentric 19. Extension 27 of countereccentric casing 20 also protrudes into radial oblong hole 28 in a lower extending flange of the eccentric casing 8. The latter thus is connected in a torsion-resistant fashion to the countereccentric casing 20. Between bearing 3' and counterbalance weight 22, spacer 30, in the form of an open ring, is placed loosely.

By turning handle 16, eccentric casing 8 and countereccentric casing 20 are turned on their eccentric 7 or countereccentric 19, respectively, so that depending on the throw of the eccentric, an automatic balance of the unbalanced mass takes place. By the connection of bearing piece 15 and handle 16, eccentric casing 8 with eccentric 7 and countereccentric casing 20 with eccentric 19 are connected in a torsion-resistant fashion so that the selected setting is retained during the rotation of drive shaft 4.

Figure 4:
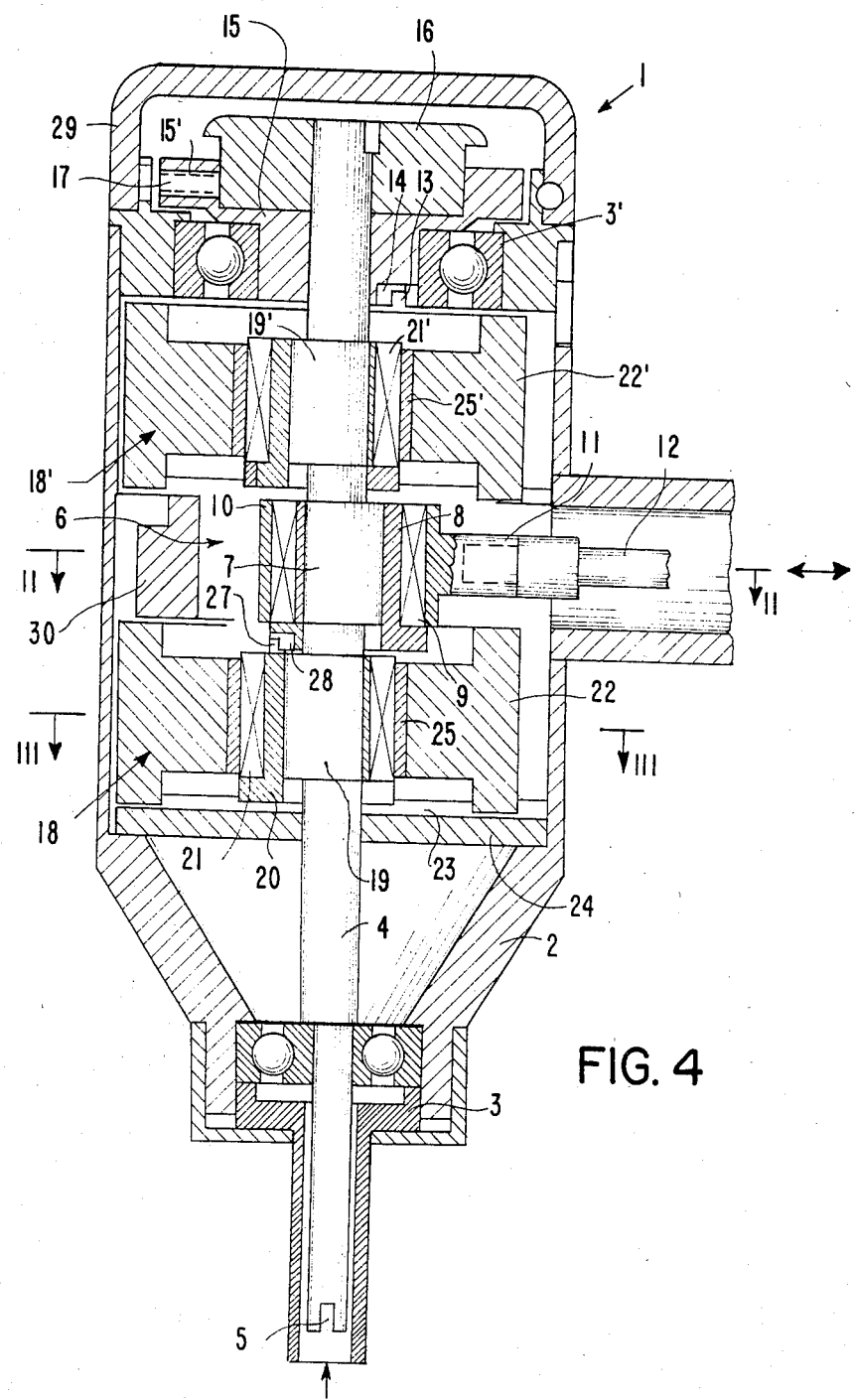
FIG. 4 shows a sectional view through the drive head of a processing machine of another embodiment.

In another embodiment, shown in FIG. 4, counterbalance weight 22 may also comprise two equal parts 22 and 22' and the two parts comprising eccentric mass balance assemblies 18 and 18' may be arranged on both sides of eccentric drive assembly 6 of drive shaft 4. For this purpose, corresponding countereccentrics 19 and 19', countereccentric cases 20 and 20', bearings 21 and 21' and bushings 25 and 25' are provided on drive shaft 4, with the latter preferably being coupled to each other in the described manner so that they can be adjusted jointly. With uniform distribution of the balance mass forces obtained in this manner, the quietness of the processing machine is increased. Since processing tools to be connected with push rod 12 do not always have the same weight, the mass balance cannot always be maintained in connection with a constant counterbalance weight 22. In order to maintain the mass balance as accurately as possible, counterbalance weight 22 or additional balancing weights, can be provided with bores 31 or the like into which additional weights can be inserted, for instance, screwed from the outside through openings correspondingly arranged in housing 2. Without demounting the processing machine, the balancing weight may thus be changed and may be adjusted to the weight of the parts to be balanced. When they are not in use, the additional weights may be stored in bores 32 or the like in the handle, or in bores 33 in a part of the housing, so that they are always handy and do not constitute any loose parts.

I claim:

1. Processing machine for the surface treatment of workpieces in which a push rod connected to a processing tool is reciprocated by an eccentric drive assembly whereby the imbalance of said eccentric drive assembly is automatically counterbalanced by an eccentric mass balance assembly, with the eccentric of said eccentric drive assembly and the countereccentric of said mass balance assembly being of equal size and being arranged non-rotatably on a drive shaft, said eccentric and said countereccentric displaced 180° about the axis of said drive shaft with respect to one another, characterized by the fact that said eccentric (7) of said eccentric drive assembly (6) is provided with an eccentric casing (8) and said countereccentric of said eccentric mass balance assembly (18) is provided with a countereccentric casing (20), that said eccentric casing (8) and said countereccentric casing (20) are connected to each other non-rotatably and together are rotatable relative to said eccentric (7) and said countereccentric (19), respectively, that on said countereccentric casing (20) there is positioned a counterbalance weight (22) which is adjustably guided in a longitudinal guide (23) parallel to said push rod (12), and that an adjusting device to change the throw of said eccentric comprises a handle (16) connected non-rotatably to said drive shaft (4) and a bearing piece (15) connected non-rotatably to said eccentric casing (8) and said countereccentric casing (20), with said handle (16) and said bearing piece (15) being non-rotatably connectable to each other by means of a setscrew (17) whereby rotation of said handle (16) with respect to said bearing plate (15) causes rotation of said eccentric (7) and said countereccentric (19) with respect to said eccentric casing (8) and said countereccentric casing (20), respectively, to change the throw of said eccentric and automatically counterbalance said eccentric drive assembly.

2. The processing machine of claim 1, wherein said eccentric casing (8) of said eccentric drive assembly (6) and said countereccentric casing (20) of said eccentric mass balance assembly (18) each has an extension (13, 27) which engages in radial oblong holes (14, 28) of said bearing piece 15 and said eccentric casing (8), respectively, coupling eccentric casing 8 and countereccentric casing (20) with said bearing piece (15).

3. The processing machine of claim 2, wherein said adjusting device of said handle (16) and said bearing piece (15) is arranged on the end of said drive shaft (4) that is opposite the connecting part (5).

4. The processing machine of claim 3, wherein said longitudinal guide (23) is arranged on a plate (24) positioned parallel to said push rod (12) between bearings (3, 3') supporting said drive shaft (4).

5. The processing machine of claim 4, wherein counterbalance weight (22) of said eccentric mass balance (18) is divided in two equal parts and arranged on both sides of said eccentric drive assembly 6.

6. The processing machine of claim 5, wherein said counterbalance weight (22) is provided bores (31) into which additional weight may be placed from the outside.

7. The processing machine of claim 6, wherein additional weights when not in use may be stored in bores (32) in said handle.

8. The processing machine of claim 6, wherein additional weights when not in use may be stored in bores (33) in part of the housing (2).

9. The processing machine of claim 1, wherein said adjusting device of said handle (16) and said bearing piece (15) is arranged on the end of said drive shaft (4) that is opposite the connecting part (5).

10. The processing machine of claim 1, wherein said longitudinal guide (23) is arranged on a plate (24) positioned parallel to said push rod (12) between bearings (3, 3') supporting said drive shaft (4).

11. The processing machine of claim 1, wherein counterbalance weight (22) of said eccentric mass balance (18) is divided in two equal parts and arranged on both sides of said eccentric drive assembly 6.

12. The processing machine of claim 1, wherein said counterbalance weight (22) is provided with bores (31) into which additional weight may be placed from the outside.

13. The processing machine of claim 1, wherein additional weights when not in use may be stored in bores (32) in said handle.

14. The processing machine of claim 1, wherein additional weights when not in use may be stored in bores (33) in part of the housing (2).

* * * * *